Figure 1:
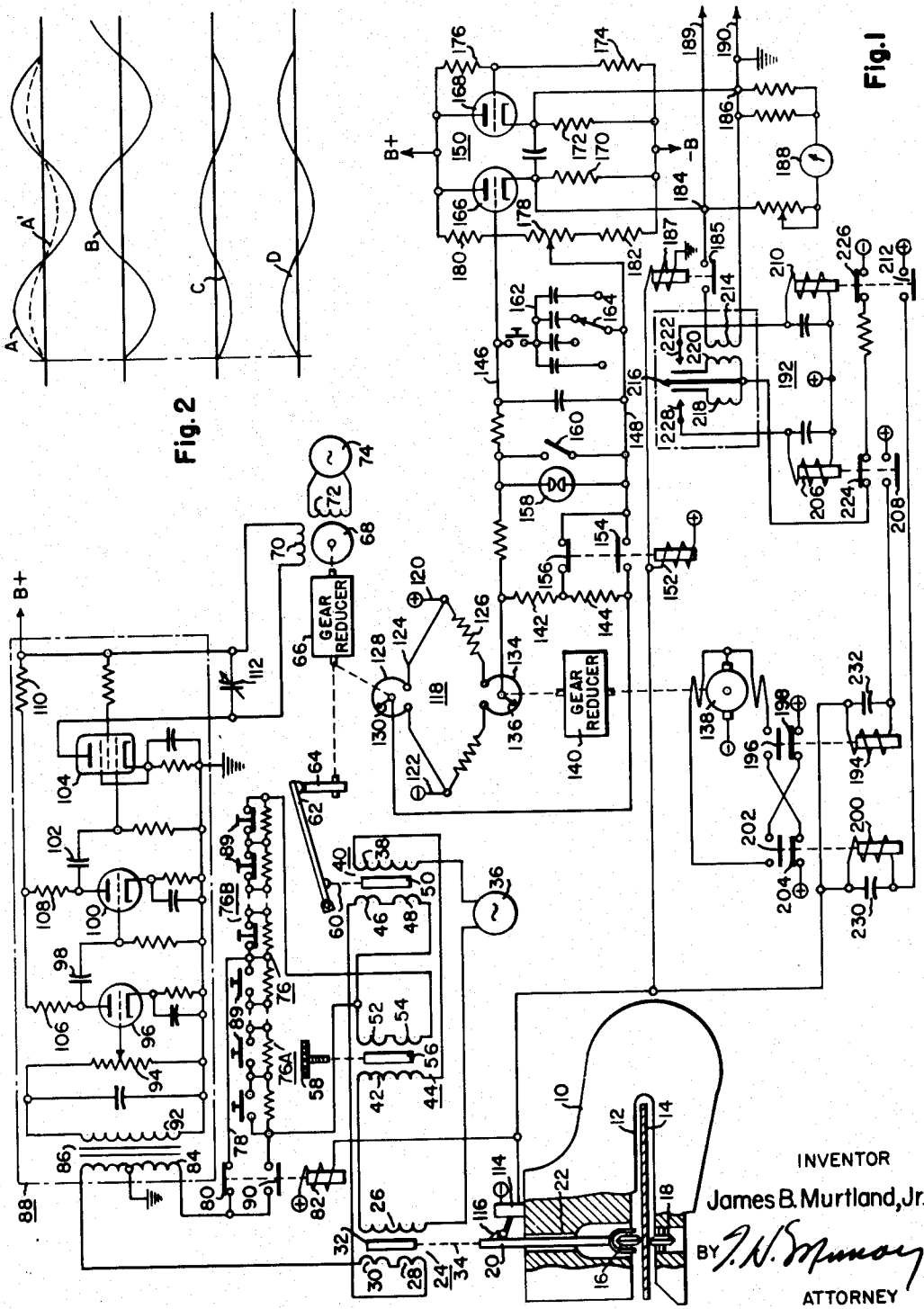

July 14, 1964  J. B. MURTLAND, JR  3,140,545
DEVIATION THICKNESS GAGE
Filed April 20, 1960

INVENTOR
James B. Murtland, Jr.
BY
ATTORNEY

United States Patent Office

3,140,545
Patented July 14, 1964

3,140,545
DEVIATION THICKNESS GAGE
James B. Murtland, Jr., Tarentum, Pa., assignor to Allegheny Ludlum Steel Corporation, Brackenridge, Pa., a corporation of Pennsylvania
Filed Apr. 20, 1960, Ser. No. 23,503
13 Claims. (Cl. 33—147)

This invention relates to apparatus for electrically measuring the deviation in thickness of an article from a predetermined value. More particularly, the invention relates to apparatus of the type described for measuring the deviation in thickness of an article by the use of analog techniques.

Although not limited thereto, the present invention is particularly adapted for use in measuring the deviation in thickness of a moving sheet or strip of material such as that passing through a rolling mill. As is well known, gages have been proposed for such applications wherein a pair of rollers are disposed on either side of a strip to be gaged, with one of the rollers being movable relative to the other to accommodate articles of different thicknesses. The movable roller is adjustably spaced from the other by means of a micrometer lead screw whereby the spacing between the rollers may be read directly from the micrometer dial. This spacing constitutes the predetermined thickness to which the gage is set. Any variation in the thickness of a sheet or other article passing through the rollers will then cause the one roller to move relative to the other; and this movement is translated, by means of an electromechanical transducer, into an electrical signal which varies as a function of the deviation in thickness of the strip from said predetermined value. The resulting signal is then used to visually indicate the deviation in gage, or for control purposes.

Although a deviation gage of the type described above has found many useful applications, its accuracy is dependent upon the skill of the operator making the initial micrometer adjustment. That is, if the initial thickness value to which the micrometer lead screw is turned by the operator is not exactly on the correct thickness value from which deviation readings are to be taken, the readings obtained will obviously be incorrect. In addition, this initial adjustment may be inaccurate due to wear of the rollers or changes in their dimensions and those of their associated parts because of temperature variations.

Accordingly, as a primary object, the present invention seeks to provide a new and improved deviation gage which automatically adjusts itself for zero deviation reading to thereby compensate for any variation in dimensions of parts due to wear or temperature changes.

More specifically, an object of the invention is to provide an analog gage capable of not only measuring the thickness of a workpiece or other article, but also capable of supplying an electrical signal for controlling associated machinery to produce the desired thickness. Thus, in a case of a rolling mill, the gage may be used to measure the thickness of a steel strip as it emerges from the rolling mill, and after comparison of the measured value against the desired value, a resulting corrective control signal for the rolling mill screw down may be applied. The system is referred to as being analog in nature since the displacement of the sensing gage due to the thickness of the strip passing through it is represented or measured by a voltage. That is, the voltage is the electrical analog of the variable being analyzed.

Still another object of the invention resides in the provision of an analog deviation gage in which errors due to inaccuracies in the initial set up of the equipment by operating personnel are virtually eliminated.

In accordance with the invention, hereinafter described, the material to be gaged is disposed between two rollers, one of which is movable relative to the other. The position of the movable roller controls a servo system which includes a servomotor and three electromechanical transducers, each of which produces an alternating current output signal which varies in amplitude as a function of the position of a movable core. One of the transducers has its core connected to the aforesaid movable roller, while the core of the second transducer is connected through a gear reducer to the servomotor, the arrangement being such that the position of the core of the second transducer will be a function of the number of revolutions of the servomotor in either direction from a starting point. These first and second transducers are adjusted whereby their output voltages are equal in amplitude and opposite in phase when the aforesaid rollers are in contact with each other, i.e., when an object is not being gaged. Thus, if the output voltages of the first and second transducers are combined in a series circuit and applied to the servomotor as a control signal, this signal will be zero when the members are in contact. When an article of a predetermined thickness is disposed between the rollers, however, the equal and opposite condition of the output signals of the first two transducers will no longer persist and, if only the two transducers were included in the system, a control signal would be fed to the servomotor to change its angular position.

The system is designed whereby any deviation in thickness of an article from a predetermined thickness is indicated by a proportional number of revolutions of the servomotor. Thus, in order to prevent the servomotor from rotating and giving an indication of a deviation in thickness when an article of said predetermined thickness is disposed between the rollers, the aforesaid third transducer is connected in series with the first two transducers and designed to produce a signal which effectively cancels the signal produced by the combination of the outputs of the first two transducers when the rollers are separated by an amount equal to said predetermined thickness. That is to say, the core of the third transducer is manually adjusted whereby the phase of its output is opposite to the phase of the signal produced by combining the outputs of the first and second transducers when an article of said predetermined thickness is disposed between the rollers. Furthermore, the output of the third transducer is adjusted in amplitude whereby it will exactly cancel the aforesaid combined outputs of the first and second transducers. In this manner, the servomotor will change its angular position to indicate a deviation in thickness only when the combination of the outputs of the first and second transducers is not equal and opposite to that of the third transducer.

Also included in the system of the invention is circuitry for indicating the number of revolutions of the servomotor which, as was explained above, is proportional to a deviation in thickness. This circuitry includes a bridge circuit for producing a first voltage which varies as a function of the number of revolutions of the servomotor from a starting point as well as a second voltage controlled by the number of revolutions of a direct current motor from a starting point. As will hereinafter be explained, the direct current motor is used to initially zero the system. The first and second voltage produced by the bridge are compared in subtractive relationship; and the resulting voltage produced when the first and second voltages are unequal is fed to a registering meter which indicates the polarity and magnitude of the resultant voltage, with the polarity of the resultant voltage being indicative of an increase or decrease in thickness and the magnitude of the voltage being indicative of the magnitude of the deviation. This resultant voltage can, of course, be used also to control a rolling mill screwdown arrangement, for example, to correct for any deviation in thickness of a strip passing through the mill.

To insure that the gage will indicate zero deviation in thickness when an article of said predetermined thickness is disposed between the aforesaid rollers, means are provided to control rotation of the direct current motor in the bridge circuit. From a consideration of the overall operation of the circuit, it will become apparent that the gage should indicate zero deviation when the rollers are in contact with each other and the third transducer is switched out of the circuit, as well as when the third transducer is switched into the circuit and the rollers are separated by an amount equal to said predetermined thickness. Accordingly, in order to zero the gage, the third transducer is switched out of the circuit when the rollers are in contact with each other, and at the same time any voltage produced across the bridge circuit is used to rotate the direct current motor in one direction or the other until the voltage across the bridge drops to zero and a zero deviation in thickness is indicated. In this manner, the gage will always yield a zero deviation indication when an article of said predetermined thickness is placed between the rollers regardless of any changes in the dimensions of the rollers due to wear or temperature variations.

Figure 2:
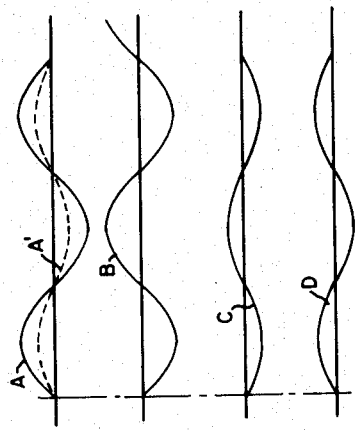

The above and other objects and features of the invention will become readily apparent from the following detailed description taken in connection with the accompanying drawings which form a part of this specification and in which:

FIG. 1 is a schematic circuit diagram of the overall system of the invention; and FIG. 2 is an illustration of wave forms appearing at various points in the circuit of FIG. 1.

Referring now to FIG. 1, there is shown a generally C-shaped gage head 10 having a slot 12 extending therethrough. The slot 12 is adapted to receive a length of sheet or strip material 14, which, as will be understood, travels into or out of the plane of the drawing. As shown, the top and bottom surfaces of the strip material 14 are engaged by precision ground gaging rollers 16 and 18, with the lower roller 18 being rotatably fixed on the gage head 10. The upper gaging roller 16 is rotatably mounted on shaft 20 which is movable up and down in a vertical plane within a slot 22 provided in the gage head 10. As the strip 14 passes through the gage head, the gaging rollers 16 and 18 will be in rolling contact with its opposite surfaces; and as the thickness or gage of the material varies, the upper gaging roller 16 and its associated shaft 20 will move upwardly or downwardly, depending upon whether the strip 14 increases or decreases in thickness. That is, when the thickness of the strip 14 increases, the gaging roller 16 and shaft 20 will move upwardly; whereas, when the thickness of the sheet decreases, these members will move downwardly.

In order to sense the position of the gaging roller 16 and shaft 20, there is provided a first electromechanical transducer, generally indicated at 24, for producing an electrical output which varies in proportion to the movement of shaft 20. The transducer 24 includes a center or primary winding 26 as well as a pair of secondary windings 28 and 30 positioned at either end of the primary winding 26 and coaxial therewith. A rod-shaped magnetically permeable core 32 is positioned axially inside the assembly and provides a path for the magnetic flux linking the windings. Core 32 is connected through a mechanical linkage 34 to the shaft 20 whereby the core 32 will be moved upwardly or downwardly, depending upon the direction of movement of the shaft 20 and roller 16. Connected in series with primary winding 26 across a source of alternating current voltage 36 is the primary winding 38 of a second transducer 40 as well as the primary winding 42 of a third transducer 44. Transducer 40 is similar in construction to transducer 24 and includes a pair of secondary windings 46 and 48 as well as a movable core member 50. Similarly, the transducer 44 includes secondary windings 52 and 54 as well as a movable core 56 which, in this case, is adjustable in position by means of a lead screw 58. In the case of transducer 40, the core 50 is connected through mechanical linkage 60 to a lever 62 which is controlled by means of a rotatable cam 64. The cam 64, in turn, is connected through gear reducer 66 to the rotor of a two-phase servomotor 68 having two phases or windings 70 and 72 included therein. Connected across winding 72 is a source of alternating current voltage 74 which is in phase with the voltage source 36. In an actual installation the voltage sources 36 and 74 would probably be one and the same; however, they are shown separately herein for purposes of explanation.

With reference to transducer 24, when the primary or center winding 26 is energized with alternating current from source 36, voltages are induced into the two outer windings 28 and 30. These secondary windings are connected in series opposition, meaning that the two voltages in the secondary circuit are opposite in phase whereby the net output of the transformer is the difference of the voltages. For one central position of the core, this output voltage will be zero. When the core 32 is moved from this central position, the voltage induced in the winding toward which the core is moved increases, while the voltage induced in the opposite winding decreases. This produces a differential voltage output which with proper design varies linearly with the change in core position.

Motion of the core in the opposite direction beyond the central position produces a similar linear voltage characteristic, with the phase shifted 180°. As the core 32 moves from the central position in either direction, the amplitude of the combined signal appearing across both of the secondary windings 28 and 30 will vary, however, the phase of the signal while the core is on one side or the other of the central position remains substantially constant. That is, the only substantial phase shift occurs when the core passes through dead center, this phase shift being 180° as was mentioned above.

Operation of transducers 40 and 44 is identical to that of transducer 24. Connected in shunt with the secondary windings 52 and 54 of transducer 44 is a resistive network, generally indicated at 76. This network comprises a series of serially-connected resistors and is divided into two halves 76A and 76B of equal resistance with the junction between the equal halves being connected through lead 78 and the normally closed contacts 80 of a relay 82 to one side of the primary winding 84 of input transformer 86. This transformer is included in an amplifier circuit, enclosed by broken lines and generally indicated at 88. It will be noted that each of the individual resistors in the network 76 is shunted by an operator-operated switch 89 and that the switches in portion 76A are normally open while those in portion 76B are normally closed. Furthermore, it will be seen that since lead 78 is connected to the midpoint of the two equal halves 76A and 76B of the resistive network, the signals appearing across the secondary windings of transducers 24 and 40 are combined in series with only that signal appearing across half 76A of network 76 and applied to the primary winding 84 of input transformer 86. Thus, when contacts 80 are closed, a series circuit is established from the upper end of primary winding 84 through the secondary windings of transducer 24, the secondary windings of transducer 40, portion 76A of network 76 and the normally closed contacts 80 to the lower end of primary winding 84. The division of network 76 into two equal halves is provided to maintain the total impedance across the secondary windings 52 and 54 of transducer 44 constant. This is necessary to maintain a linear output characteristic of the transducer based on a constant load. Thus, whenever one of the switches 89 in portion 76A is closed to vary the resistance in the series circuit described above, a corresponding switch across a resistor of equal value will be opened in portion 76B so that the total resistance presented across windings 52 and 54 is constant, even though the resistance in each half is varied.

If relay 82 is energized so that its normally closed contacts 80 are open while its normally open contacts 90 are closed, only the secondary windings of transducers 24 and 40 will be connected in series across the primary winding 84 of input transformer 86. Under these conditions, a series circuit is established between the opposite ends of primary winding 84 through the secondary windings of transducer 24, the secondary windings of transducer 40, and the normally open contacts 90. Since the contacts 80 are open during this time, the resistive network 76 is effectively switched out of the circuit.

In amplifier 88 the voltages appearing across the secondary winding 92 of input transformer 86 are applied via variable resistor 94 to the grid of a first triode amplifier tube 96. The output of triode 96 is then applied in cascade relationship through capacitor 98 to the grid of a second triode amplifier tube 100 having its anode connected through capacitor 102 to the control grid of a pentode vacuum tube 104. As shown, the anodes of triodes 96 and 100 are connected through resistors 106, 108 and 110 to a source of plate voltage, identified as B+. The plate of pentode 104, however, is connected to the source of plate voltage through one winding or phase 70 of the servomotor 68. With this arrangement, the servomotor 68 will be rotated in one direction or the other, depending upon the phase of the signal applied to amplifier 88 with respect to the phase of signal source 74.

It should be noted at this time that the combination of transducers 24, 40 and 44, the amplifier 88 and the servomotor 68 constitute a closed servo loop. Each time that a voltage appears at the output of amplifier 88, the servomotor 68 will restore balance to the servo loop by positioning the movable core 50 in transducer 40 until a voltage null is reached in the servo loop. Since the servomotor 68 is a two-phase motor, and since such a motor requires a distinct phase relationship between the voltages on its respective windings, a tuning capacitor 112 is shunted across winding 70 of the motor.

Reverting again to the relay 82, it is energized by closure of a limit switch 114 positioned on the gage head 10. As shown, the shaft 20 is provided with a nub or projection 116 which will move downwardly to close the limit switch 114 and energize relay 82 whenever the strip 14 is removed from the gage head so that the gaging rollers 16 and 18 are in contact. Thus, whenever an article is not being gaged so that the rollers 16 and 18 are in contact, relay 82 will be energized to close contacts 90 and open contacts 80. As was explained above, this action switches the secondary windings of transducer 44 and the resistive network 76 out of the servo loop.

Operation of the servo loop may best be understood by reference to the wave forms of FIG. 2. Transducers 24 and 40 are adjusted such that when an article is not being gaged and the rollers 16 and 18 are in contact with each other, the alternating current output voltages appearing across their secondary windings will be equal in amplitude and opposite in phase. Thus, during this time, the signal appearing across secondary windings 28 and 30 of transducer 24 may appear as wave form A in FIG. 2; whereas, the signal appearing across secondary windings 46 and 48 of transducer 40 may appear as wave form B. Remembering that relay 82 is energized to close contacts 90 when rollers 16 and 18 are in contact, the wave forms A and B are combined in series since transducer 44 is now switched out of the circuit. Since the combination of these signals is zero, the output signal of amplifier 88 as applied to winding 70 will also be zero. As will hereinafter become apparent, the system is designed whereby any deviation in the gage of article 14 from a predetermined thickness will be indicated by a proportional amount of rotation of servomotor 68. For purposes of explanation, it will be assumed that the desired thickness of the strip 14 passing through the gaging rollers 16 and 18 is 0.255 inch. When a strip of this thickness is inserted between the rollers 16 and 18, the limit switch 114 opens so that relay 82 becomes deenergized and contacts 90 open while contacts 80 close. Under these circumstances, portion 76A of resistive network 76 is connected in series with the secondary windings of transducers 24 and 40 as was explained above. Since the movable core 32 of transducer 24 is shifted in position when the strip 14 is inserted between the rollers 16 and 18, the wave form across the secondary windings 28 and 30 is no longer exactly equal in amplitude with respect to the wave form B appearing across the secondary windings 46 and 48 of transducer 40. Rather, a new wave form, identified as A' in FIG. 2, will appear across the secondary windings of transducer 24. This new wave form is reduced in amplitude by virtue of the fact that core 32 has been shifted in position. If it were not for the fact that the transducer 44 and its associated resistive network 76 are now switched into the circuit, the servomotor 68 would be rotated when the strip 14 is inserted between the gaging rollers 16 and 18 even though its gage is exactly 0.255 inch. That is, if the transducer 44 and its associated resistive network 76 where not included in the circuit at this time, the wave form A' and wave form B in FIG. 2 would combine to produce wave form C which would rotate the servomotor 68 to indicate a deviation in thickness. By including transducer 44 and its associated resistive network 76 in the circuit, however, a signal can be made to appear across portion 76A of the resistive network 76 which is exactly equal in amplitude, and opposite in phase, to the wave form C. Thus, the signal appearing across portion 76A of the resistive network 76 which is combined in series with those signals appearing across the secondary windings of transducers 24 and 40 will appear as wave form D in FIG. 2. Since this wave form is exactly equal in amplitude, and opposite in phase, to wave form C, the resultant signal fed to the servomotor 68 will be zero and the servomotor 68 will not rotate. In order to adjust the phase of wave form D so that it is opposite in phase to wave form C, the lead screw 58 is turned to position the core 56 of transducer 44 so that it will produce the proper phase in the signal appearing across the resistive network 76. The position of the core 56 need be adjusted only when the apparatus is initially set up and calibrated since the phase of wave form C will not vary appreciably for various strip thicknesses. This will be apparent from a consideration of the operation of the transducers given above. Thus, once the apparatus is calibrated, the operator no longer need be concerned with the screw 58. The amplitude of wave form C will, however, vary for different strip thicknesses. The amplitude of wave form D may be adjusted so that it will be exactly equal to the amplitude of wave form C by closing selected ones of the switches 89 in portion 76A of resistive network 76 while opening selected switches 89 in portion 76B to present proper resistance across secondary windings 52 and 54 of transducer 44. The various switches 89 are coded for various strip thicknesses. Thus, if the operator desires to obtain deviation readings from a 0.255 inch gage, he will merely open or close the necessary switches 89 which the code specifies for that particular gage; and since the correct amplitude of the signal across the resistive network 76 is selected by merely closing or opening switches, little or no possibility exists of error due to misadjustment on the part of operating personnel. As will be understood, the correct switches for a particular gage may be closed or opened by depressing selected push buttons, ten of which are provided for each of units, tens, hundreds, etc. Thus, if the gage is 0.255 inch, the operator will merely depress the 2 button in the tens group, the 5 button in the hundreds group, and the 5 button in the thousands group.

If the desired thickness of the strip 14 is 0.255 inch, proper switches 89 will be closed or opened, as the case may be, so that the wave form D produced by the transducer 44 will exactly cancel the combined wave form C produced across the secondary windings of transducers 24 and 40. As long as the thickness of strip 14 remains at 0.255 inch in passing through the gaging rollers 16 and 18, the output voltage applied to the winding 70 of servomotor 68 will be zero and no rotation will be produced in the servomotor. If, however, the gage of the strip 14 should increase, the core 32 of transducer 24 will be moved upwardly so that the amplitude of wave form A′ will be varied as will the amplitude of wave form C. Under these circumstances, the wave forms C and D will no longer be equal and opposite; and, consequently, a signal will appear across winding 70 to rotate the servomotor 68 in one direction through a number of revolutions proportional to the deviation in thickness. Similarly, if the gage of strip 14 decreases, the servomotor 68 will be rotated in the opposite direction through a number of revolutions proportional to the decrease in thickness. It will be understood, of course, that when the servomotor 68 rotates, it varies the position of core 50 in transducer 40 through gear reducer 66, cam 64 and lever 62 whereby the wave forms C and D will again balance when the servomotor has rotated through a number of angular degrees proportional to the deviation in thickness of the strip 14.

In order to translate the rotation of the servomotor 68 into a visual indication of the deviation in thickness of the strip 14, circuitry including a bridge circuit 118 is provided. The bridge circuit includes input terminals 120 and 122 which are adapted for connection to a source of direct current voltage, not shown. Terminals 120 and 122 are interconnected by two parallel current paths 124 and 126, substantially as shown. Current path 124 includes a potentiometer having a circular resistive element 128 and rotatable tap 130 slidable along the resistive element whereby the voltage appearing on the tap will be a function of its angular position. This tap is connected through mechanical linkage to the gear reducer 66 whereby the voltage on tap 130 will vary as a function of the angular position of the servomotor. The other current path 126 includes a second potentiometer having a circular resistive element 134 and a rotatable tap 136 slidable thereon. As was the case with the potentiometer in path 124, the voltage on tap 136 will be a function of the angular position of tap 136; and this angular position is, in turn, controlled by rotation of a shunt wound direct current motor 138 which is connected to the tap 136 through gear reducer 140. As will be understood, the function of the potentiometer connected to servomotor 68 is to create, through its movable tap position, a voltage representing the zero position of the gage sensing device. If, at any time, the movable tap 130 is at a position wherein the voltage at this tap is lesser or greater than the voltage on the movable tap 136 of the other potentiometer, a measurement of deviation in strip gage is being indicated. Should there be no voltage differential between taps 130 and 136 of the potentiometers, the significance is that the gage sensing device is at physical zero.

The taps 130 and 136 comprise, in effect, the output terminals of the bridge circuit 118 and are connected as shown to the opposite ends of a resistive network comprising resistors 142 and 144 connected in series and wherein the sensitivity for the ensuing indicating equipment is determined. Whenever the bridge circuit 118 becomes unbalanced so that the voltage on tap 130 is not equal to the voltage on tap 136, a voltage will appear across resistors 142 and 144, and this voltage is applied via leads 146 and 148 to the input of a balanced amplifier, generally indicated at 150. The full voltage across resistors 142 and 144 will be applied to the balanced amplifier when relay 152 is energized so that contacts 154 are closed while contacts 156 are open. When relay 152 is deenergized, as it normally is, contacts 156 will close while contacts 154 open so that only the voltage across resistor 142 is applied to the input of balanced amplifier 150. Relay 152 is, in turn, controlled by the limit switch 114, the arrangement being such that when gaging rollers 16 and 18 are in contact with each other, the limit switch 114 will close to energize relay 152 and close contacts 154. A neon lamp 158 is connected across leads 146 and 148 whereby any excessive unbalance of the bridge 118 is prevented from saturating the amplifier 150 by virtue of the fact that the neon bulb will fire at an excessively high voltage. Similarly, a switch 160 can be closed to connect the leads 146 and 148 together whereby the input to the balanced amplifier 150 will be zero. As will hereinafter be explained, this switch is provided in order to initially balance the amplifier 150. Also connected between the leads 146 and 148 is a sensitivity network 162 which comprises a plurality of capacitors, any one of which may be connected between leads 146 and 148 by switch 164.

Balanced amplifier 150 comprises a pair of triode amplifier tubes 166 and 168 having their cathodes connected through resistors 170 and 172 to a source of negative voltage, indicated at B—. The anodes of the triodes 166 and 168 are connected directly to a source of positive plate voltage, identified as B+. The control grid of triode 168 is connected to a voltage divider network consisting of resistors 174 and 176; whereas the grid of triode 166 is connected to lead 146. Lead 148, on the other hand, is connected to a movable tap on resistor 178 which is part of a voltage divider including resistors 180 and 182. With this arrangement, the switch 160 may be closed and the tap on resistor 178 may be adjusted whereby the voltages at the cathodes of triodes 166 and 168 will be equal. Therefore, when the amplifier 150 is balanced, the voltages appearing at its output terminals 184 and 186 will be the same. These voltages are applied, as shown, to a meter 188 the pointer of which will remain in one central position as long as the voltages on terminals 184 and 186 are the same. If the voltage on lead 186 should become greater than that on terminal 184, the pointer of meter 188 will deflect in one direction; whereas, if the opposite condition persists, the pointer of meter 188 will deflect in the opposite direction. The signals on output terminals 184 and 186 may also be applied, via leads 189 and 190, to control circuitry such as that which controls the screwdown in a rolling mill to correct for any deviation in gage sensed by the equipment shown herein.

Assuming that the voltages on taps 130 and 136 are equal when the thickness of strip 14 is at the gage from which deviation measurements are to be taken, the outputs on terminals 184 and 186 will be equal and meter 188 will show no deviation in thickness of the strip 14 from the desired thickness. If the desired gage of strip 14 is 0.255 inch and if the actual thickness of the strip increases from this value, the outputs of the transducers 24, 40 and 44 will no longer be balanced, and the servomotor 68 will be rotated whereby the voltage on tap 130 will no longer be equal to that on tap 136. Consequently, the voltages on output terminals 184 and 186 of balanced amplifier 150 will also no longer be equal so that the pointer of meter 188 will be deflected, say, to the right to indicate the amount of increase in thickness. At the same time, the signal on leads 189 and 190 may be applied to the control apparatus for a rolling mill screwdown, not shown, which will adjust the spacing between the rolls of the mill to produce the desired thickness in strip 14. On the other hand, if the thickness of the strip 14 should decrease, the servomotor 68 will be rotated in the opposite direction so that the voltages on taps 130 and 136 will again no longer balance. However, in this case, the relative magnitudes of the voltages on output terminals 184 and 186 of balanced amplifier 150 will be reversed so that the pointer of meter 188 will be deflected to the left for the example given to indicate that the strip has decreased in thickness from the desired thickness.

The foregoing description of operation assumed, of course, that when the strip 14 was at the desired thickness of 0.255 inch the voltages on taps 130 and 136 were equal. These voltages will be equal under these circumstances if the diameters of the gaging rollers 16 and 18 are exactly equal to what they were when the system was calibrated for the correct positioning of core 56 in transducer 44 and the proper resistance in resistive network 76. Since, however, the diameters of the rollers 16 and 18 may vary due to wear or temperature variations, some means must be provided to insure that the gage will indicate zero deviation in thickness at the proper time regardless of any differences in the diameters of rollers 16 and 18. For this purpose circuitry including a meter relay, generally indicated at 192, and the shunt wound direct current motor 138 are provided.

From an examination of FIG. 2, it will be seen that when the system is properly calibrated, the wave form A will cancel wave form B when the rollers 16 and 18 are in contact with each other. If these waveforms do not cancel when the rollers are in contact, then incorrect deviation readings will be obtained. Accordingly, means are provided for rotating the movable tap 136 when the rollers 16 and 18 are in contact with each other so that the voltages on taps 130 and 136 balance and the meter 188 indicates zero deviation in thickness. In this manner, when an article of the correct thickness is disposed between the rollers 16 and 18, the meter will still indicate zero deviation in thickness.

It will be noted that direct current motor 138 will be energized to rotate in one direction when relay 194 is energized and contacts 196 are closed while contacts 198 are open. In a similar manner, the direct current motor 138 will be rotated in the opposite direction when relay 200 is energized to close contacts 202 and open contacts 204. Relay 194 will be energized to rotate direct current motor 138 in one direction when the gaging rollers 16 and 18 are in contact to close limit switch 114 and when relay 206 in the meter relay 192 is energized to close its normally open contacts 208. Similarly, the relay 200 will be energized to rotate the motor 138 in the opposite direction when limit switch 114 is closed and when relay 210 in the meter relay 192 is energized to close its normally open contacts 212.

The meter relay 192 includes an inductor 214 connected to the output terminals 184 and 186 of the balanced amplifier 150 through the normally open contacts 185 of relay 187 which, it will be noted, is energized to close contacts 185 by closure of limit switch 114. Thus, a voltage will be induced across the inductor 214 whenever the bridge 118 becomes unbalanced and the rollers 16 and 18 are in contact. Element 214 is inductively coupled to a pivoted pointer 216 provided with two windings 218 and 220 insulated therefrom. When the voltage across inductor 214 has one polarity, the pointer 216 will be rotated to the right whereby the upper end of winding 220, being insulated from the pointer, will make contact with contact point 222. This completes a circuit to the energizing winding of relay 210 through winding 220, the normally closed contacts 224 of relay 206 and the normally closed contacts 226 of relay 210. The current through winding 220 is such that it will produce an electromagnetic field tending to repel the pointer 216 from the inductor 214. It will also be noted that once the relay 210 is energized, the contacts 226 open to break the circuit through its energizing winding. In this manner, as long as a voltage of the proper polarity remains on inductor 214, the pointer 216 will move back and forth whereby the upper end of winding 220 will intermittently make and break contact with point 222, and the relay 210 will be pulsed or energized intermittently to likewise intermittently close contacts 212 in the energizing circuit for relay 200.

If the voltage across inductor 214 is reversed, however, the pointer 216 will be repelled whereby the upper end of winding 218 will make contact with contact point 228. Under these circumstances, the relay 206 will be pulsed or energized intermittently to intermittently close contacts 208 which are in the energizing circuit for relay 194. Capacitors 230 and 232 are provided across relays 200 and 194, respectively, and are designed to provide a large RC time constant whereby the relays 200 and 194 will remain energized as long as the contacts 208 or 212 are intermittently closed or pulsed.

As was stated above, when the strip 14 passes through gaging rollers 16 and 18, they will move into contact and limit switch 114 will be closed to energize relays 82, 152 and 187. Thus, when the gaging rollers 16 and 18 are in contact with each other, transducer 44 and its associated resistive network 76 will be switched out of the circuit. If the voltages on taps 130 and 136 are not exactly equal at this time, a voltage will appear across the output terminals 184 and 186 of the balanced amplifier 150. This voltage, however, will be larger than it ordinarily would be due to the fact that both of the resistors 142 and 144 are connected between leads 146 and 148. This condition prevails since relay 152 is now energized to open contacts 156 and close contacts 154 and gives the system greater sensitivity for calibration purposes. Since limit switch 114 is now closed, relay 187 is energized to close contacts 185 and the motor 138 may be energized through relay 194 or 200, depending upon the polarity of the voltage appearing across output terminals 184 and 186. The arrangement is such that the motor 138 will be driven to position contact 136 whereby the voltages on contacts 130 and 136 will be equal. The system is now zeroed or calibrated, and when an article of the correct thickness is positioned between the rollers 16 and 18, the meter 188 will indicate zero deviation in thickness. When the strip 14 is inserted between the rollers 16 and 18, relays 82, 152 and 187 will be de-energized, and the transducer 44 and its associated resistive network 76 will be inserted into the circuit whereby a deviation reading may be obtained.

The invention thus provides a means for automatically compensating for variations in the dimensions of gaging rollers due to wear or temperature changes. At the same time, the invention provides a means whereby the thickness from which deviation readings are taken may be selected by merely closing switches, thereby minimizing the possibility of errors due to inaccurate adjustments on the part of an operator. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a gage for indicating the deviation in thickness of an article from a predetermined value, the combination of a pair of members between which an article to be gaged is disposed, one of said members being fixed and the other member being movable toward and away from the fixed member to accommodate articles of different thicknesses, a servo system having a servomotor therein and adapted to produce movement in the servomotor proportional to the deviation in thickness of said article from said predetermined value, first transducer means in the servo system operatively connected to said other member, second transducer means in the servo system operatively connected to said servomotor, means including a variable resistive network connected in series with said first and second transducer means for cancelling the combined signal produced by the first and second transducer means when an article of said predetermined thickness value is disposed between said members, and registering means for indicating the amount of movement of said servomotor.

2. In a gage for indicating the deviation in thickness of an article from a predetermined value, the combination of a pair of separable members between which an article to be gaged is disposed, a servo system having a servomotor therein, first transducer means in the servo system operatively connected to said one movable member, second transducer means in the servo system operatively connected to the servomotor, means in the servo system including a selectively adjustable resistive network and a transformer device having an adjustable core therein, said resistive network and transformer device being connected in series with the first and second transducer means and adapted to cancel the resultant signal produced by said first and second transducer means when an article of said predetermined thickness is disposed between said members, and registering means for indicating the amount of movement of said servomotor.

3. In a gage for indicating the deviation in thickness of an article from a predetermined value, the combination of a pair of members between which an article to be gaged is disposed, one of said members being fixed and the other member being movable toward and away from said one member to accommodate articles of different thicknesses, a switch device actuated when said members are in contact with each other, a servo system operatively connected to said other member and having a servomotor therein, said servo system being adapted to produce movement in the servomotor proportional to the deviation in thickness of the article from said predetermined value when the switch device is not actuated, registering means operatively connected to said servomotor for indicating the deviation in thickness of an article disposed between said members from said predetermined value, and apparatus in the registering means and operable when said members are in contact with each other and said switch device is actuated for adjusting the registering means whereby it will indicate zero deviation in thickness from said predetermined value when an article of said predetermined value is disposed between the members.

4. In a gage for indicating the deviation in thickness of an article from a predetermined value, the combination of a pair of separable members between which an article to be gaged is disposed, a servo system having a servomotor therein and adapted to produce movement in said servomotor proportional to the deviation in thickness of the article from said predetermined value, means in the servo system for controlling operation of said servomotor and including electromechanical transducer means operatively connected to one of said separable members and said servomotor and adapted to produce an alternating current signal having an amplitude which varies as a function of the thickness of an article disposed between said separable members, a device including a variable resistive network in said servo system for producing an alternating current signal which is equal in amplitude and opposite in phase with respect to the signal produced by said transducer means when an article of said predetermined thickness value is disposed between said separable members, means in the servo system for connecting said transducer means in series with said device and for applying the signal produced by the series combination to the servomotor to control the same, and registering means operatively connected to said servomotor for indicating the deviation in thickness of an article disposed between the separable members from said predetermined thickness value.

5. A gage for indicating the deviation in thickness of an article from a predetermined value comprising, in combination, first and second members between which an article to be gaged is disposed, at least one of said members being movable relative to the other to accommodate articles of different thicknesses, a servo system including first transducer means operatively connected to said one movable member and adapted to produce a first alternating current signal having an amplitude which varies as a function of the thickness of the article being gaged, a rotatable servomotor, second transducer means operatively connected to said servomotor and adapted to produce a second alternating current signal having an amplitude dependent upon the angular position of said servomotor, means including a variable resistive network for producing a third alternating current signal having an adjustable phase and amplitude, circuit means for connecting said first and second transducer means in series with said means including a variable resistive network to produce a resultant signal which is the sum of the respective first, second and third signals, means for applying said resultant signal produced by the series combination to the servomotor to control the same, and registering means for indicating the number of revolutions of said servomotor from a starting point.

6. A gage for indicating the deviation in thickness of an article from a predetermined value comprising, in combination, first and second members between which an article to be gaged is disposed, at least one of said members being movable relative to the other to accommodate articles of different thicknesses, a servo system including first transducer means operatively connected to said one movable member for producing a first alternating current signal having an amplitude which varies as a function of the thickness of an article being gaged, a servomotor, second transducer means operatively connected to said servomotor and adapted to produce a second alternating current signal having an amplitude dependent upon the amount of movement of said servomotor from a starting point, means for selectively combining said first and second signals and for applying the combined signal to the servomotor to control the same, the arrangement being such that when the members are in contact with each other, the first and second alternating current signals will be equal and opposite in phase and the combined signal applied to the servomotor will be zero, means including a variable resistive network for producing a third alternating current signal which is substantially 180° out of phase with respect to the signal produced by combining said first and second signals when an article of said predetermined value is disposed between said members, means for selectively connecting said first and second transducer means in series with said means for producing a third alternating signal, means for adjusting said resistive network to control the amplitude of said third signal whereby the combination of said first, second and third signals will be zero when an article of said predetermined value is disposed between said members, and registering means for indicating the amount of movement of said servomotor.

7. A gage for indicating the deviation in thickness of an article from a predetermined value, comprising, in combination, first and second members between which an article to be gaged is disposed, at least one of said members being movable toward and away from the other to accommodate articles of different thicknesses, a servo system including first transducer means operatively connected to said one movable member for producing a first alternating current signal having an amplitude which varies as a function of the thickness of the article being gaged, a servomotor, second transducer means operatively connected to said servomotor and adapted to produce a second alternating current signal having an amplitude dependent upon the amount of movement of said servomotor from a starting point, means including a variable resistor network for producing a third alternating current signal which is substantially 180° out of phase with respect to the signal produced by combining said first and second signals in series when an article of said predetermined value is disposed between said members, means for connecting said first and second transducer means in series with said means for producing a third alternating current signal, means for adjusting the variable resistive network to control the amplitude of said third signal whereby the combination of said first, second and third signals will be zero when an article of said predetermined thickness value is disposed between said members, means for applying the combined signal to said servomotor to control the same, and registering means for indicating the amount of movement of said servomotor.

8. A gage for indicating the deviation in thickness of an article from a predetermined value comprising, in combination, first and second members between which an article to be gaged is disposed, at least one of said members being movable toward and away from the other to accommodate articles of different thicknesses, a servo system including first transducer means operatively connected to said one movable member for producing a first alternating current signal having an amplitude which varies as a function of the thickness of the article being gaged, a servomotor, second transducer means operatively connected to said servomotor and adapted to produce a second alternating current signal having an amplitude dependent upon the amount of movement of said servomotor, transformer means including primary and secondary windings and adapted to produce a signal across said secondary windings which is 180° out of phase with respect to the signal produced by combining the first and second signals in series when an article of said predetermined thickness value is disposed between said members, voltage divider means connected in shunt with said secondary windings, a pair of output terminals for the voltage divider across which a signal appears which is in phase with the signal appearing across said secondary winding but reduced in amplitude with respect thereto, series circuit means for combining said first and second signals with the signal across said output terminals, means for applying the combined signal to said servomotor to control the same, and registering means for indicating the amount of movement of said servomotor.

9. A gage for indicating the deviation in thickness of an article from a predetermined value comprising, in combination, first and second members between which an article to be gaged is disposed, at least one of said members being movable relative to the other to accommodate articles of different thicknesses, a servo system including a first transducer having primary and secondary windings and a movable core operatively connected to said one movable member whereby the amplitude of the signal appearing across said secondary winding varies as a function of the thickness of an article disposed between said members, a servomotor, a second transducer having primary and secondary windings and a movable core operatively connected to the servomotor whereby the amplitude of the signal appearing across its secondary winding will be a function of the amount of movement of said servomotor from a starting point, a third transducer having primary and secondary windings and a movable core which may be selectively positioned to vary the phase of the signal appearing across its secondary winding, a variable resistive network, a source of alternating current voltage, means connecting the primary windings of said first, second and third transducers in series across said source of alternating current voltage, an amplifier having input and output terminals, means connecting the secondary windings of said first, second and third transducers in series with said resistive network across the input terminals of said amplifier, means for applying the signal appearing across the output terminals of said amplifier to the servomotor to control the same, and registering means for indicating the amount of movement of said servomotor.

10. In a gage of the type adapted to indicate the deviation in thickness of an article from a predetermined value, a pair of separable members between which an article to be gaged is disposed, a servo system including a servomotor, said servo system being operatively connected to one of said members and adapted to produce movement in the servomotor proportional to the deviation in thickness from said predetermined value of an article disposed between said members, a bridge circuit having a pair of input terminals adapted for connection to a source of voltage, a first potentiometer in the bridge circuit having a resistance element connected between said input terminals and a movable tap on the resistive element operatively connected to said servomotor, a second potentiometer in the bridge circuit having a resistive element connected between said input terminals and a movable tap on the resistive element, a motor device connected to the movable tap on said second potentiometer, means for comparing the voltages on the respective taps to produce a resultant voltage when said bridge circuit is unbalanced, means for indicating the polarity and magnitude of said resultant voltage, and means responsive to said resultant voltage and operable when said separable members are in contact with each other for actuating said motor device to adjust the movable tap on said second potentiometer to produce a condition wherein the bridge circuit is balanced and the voltages on said taps are equal.

11. In a gage of the type adapted to indicate the deviation in thickness of an article from a predetermined value, a pair of separable members between which an article to be gaged is disposed, a servo system including a servomotor, such servo system being operatively connected to one of said members and adapted to produce movement in the servomotor proportional to the deviation in thickness from said predetermined value of an article disposed between the said members, means for producing a first voltage which varies as a function of the position of said servomotor, a motor device, means for producing a second voltage which varies as a function of the position of said motor device, means for comparing said first and second voltages in subtractive relationship to produce a resultant voltage when said first and second voltages are unequal, means for indicating the magnitude and polarity of said resultant voltage, and means responsive to said resultant voltage and operable when said separable members are in contact with each other for actuating said motor device to adjust said means for producing a second voltage whereby the first and second voltages will be equal.

12. In a gage of the type adapted to indicate the deviation in thickness of an article from a predetermined value, a pair of separable members between which an article to be gaged is disposed, a servo system including a servomotor, said servo system being operatively connected to one of said members and adapted to produce movement in the servomotor proportional to the deviation in thickness from said predetermined value of an article disposed between said members, a bridge circuit having a pair of input terminals adapted for connection to a source of voltage, a first potentiometer in the bridge circuit having a resistance element connected between said input terminals and a movable tap on the resistive element operatively connected to said servomotor, a second potentiometer in the bridge circuit having a resistive element connected between said input terminals and a movable tap on the resistive element, a motor device connected to the movable tap on said second potentiometer, a resistor, means connecting said movable taps to opposite ends of said resistor, and a device responsive to the voltage produced across said resistor and operable when said separable members are in contact with each other for actuating said motor device to move the adjustable tap on said second potentiometer in one direction when the voltage across said resistor has one polarity and in the opposite direction when said voltage across the resistor has the opposite polarity.

13. A gage for indicating the deviation in thickness of an article from a predetermined value comprising, in combination, first and second members between which an article to be gaged is disposed, at least one of said members being movable relative to the other to accommodate articles of different thicknesses, a servo system including first transducer means operatively connected to said one movable member for producing a first alternating current signal having an amplitude which varies as a function of the thickness of an article being gaged, a servomotor, second transducer means operatively connected to said servomotor and adapted to produce a second alternating current signal having an amplitude dependent upon the amount of movement of said servomotor from a starting point, means operable when said members are in contact with each other for combining said first and second signals and for applying the combined signal to the servomotor to control the same, means for producing a third alternating current signal which is substantially 180° out of phase with respect to the signal produced by combining said first and second signals when an article of said predetermined value is disposed between said members, means operable when said members are separated for combining said first, second and third signals, means for controlling the amplitude of said third signal whereby the combination of said first, second and third signals will be zero when an articles of said predetermined value is disposed between said members, a bridge circuit having a pair of input terminals adapted for connection to a source of voltage, a first potentiometer in the bridge circuit having a resistance element connected between said input termials and a movable tap on the resistive element operatively connected to said servomotor, a second potentiometer in the bridge circuit having a resistive element connected between said input terminals and a movable tape on the resistive element, a motor device connected to the movable tap on said second potentiometer, means for comparing the voltages on the respective taps to produce a resultant voltage when said bridge circuit is unbalanced, means for indicating the polarity and magnitude of said resultant voltage, and means responsive to said resultant voltage and operable when said separable members are in contact with each other for actuating said motor device to adjust the movable tap on said second potentiometer to produce a condition wherein the bridge circuit is balanced and the voltages on said taps are equal.

References Cited in the file of this patent
UNITED STATES PATENTS

| | | |
|---|---|---|
| 2,610,052 | Macgeorge | Sept. 9, 1952 |
| 2,659,154 | Rendel | Nov. 17, 1953 |
| 2,689,339 | Hornfeck | Sept. 14, 1954 |
| 2,848,815 | Scheu | Aug. 26, 1958 |
| 2,876,551 | Bowlby | Mar. 10, 1959 |
| 3,000,101 | Giardino et al. | Sept. 19, 1961 |